United States Patent
McClymont, Jr.

(10) Patent No.: US 11,438,354 B2
(45) Date of Patent: Sep. 6, 2022

(54) SYSTEMS AND METHODS FOR UTILIZING MACHINE LEARNING MODELS TO DETECT CLOUD-BASED NETWORK ACCESS ANOMALIES

(71) Applicant: Verizon Patent and Licensing Inc., Arlington, VA (US)

(72) Inventor: Scott McClymont, Jr., Ringoes, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 380 days.

(21) Appl. No.: 16/673,538

(22) Filed: Nov. 4, 2019

(65) Prior Publication Data
US 2021/0136097 A1    May 6, 2021

(51) Int. Cl.
*H04L 9/40*    (2022.01)
*G06N 20/00*    (2019.01)

(52) U.S. Cl.
CPC ......... *H04L 63/1425* (2013.01); *G06N 20/00* (2019.01); *H04L 63/1441* (2013.01)

(58) Field of Classification Search
CPC . H04L 63/1425; H04L 63/1441; H04L 63/20; G06N 20/00; G06N 3/08
See application file for complete search history.

(56) References Cited

U.S. PATENT DOCUMENTS

| | | | |
|---|---|---|---|
| 8,601,531 B1* | 12/2013 | Zolfonoon | G06F 21/604 726/1 |
| 10,853,350 B1* | 12/2020 | Sharifi Mehr | H04L 63/10 |
| 2018/0293377 A1* | 10/2018 | Tomonaga | G06F 21/552 |
| 2019/0327271 A1* | 10/2019 | Saxena | G06N 20/00 |
| 2020/0280573 A1* | 9/2020 | Johnson | G06N 5/025 |
| 2020/0296117 A1* | 9/2020 | Karpovsky | H04L 67/42 |

OTHER PUBLICATIONS

Du, Min, et al. "Deeplog: Anomaly detection and diagnosis from system logs through deep learning." Proceedings of the 2017 ACM SIGSAC Conference on Computer and Communications Security. 2017. (Year: 2017).*
M. Tharshini, M. Ragavinodini and R. Senthilkumar, "Access Log Anomaly Detection," 2017 Ninth International Conference on Advanced Computing (ICoAC), 2017, pp. 375-381, doi: 10.1109/ICoAC.2017.8441194. (Year: 2017).*

* cited by examiner

*Primary Examiner* — Robert B Leung (57) ABSTRACT

A device may receive log data identifying access of user devices to containers provided by a cloud-based network, and may aggregate the log data to generate aggregated log data identifying container profiles associated with the containers. The device may train one or more machine learning models, with the aggregated log data, to generate one or more trained machine learning models, and may receive particular log data identifying access of a particular user device, of the user devices, to a particular container of the containers provided by the cloud-based network. The device may process the particular log data, with the one or more trained machine learning models, to identify an anomaly associated with the access of the particular user device to the particular container, and may perform one or more actions based on identifying the anomaly.

20 Claims, 9 Drawing Sheets

SYSTEMS AND METHODS FOR UTILIZING MACHINE LEARNING MODELS TO DETECT CLOUD-BASED NETWORK ACCESS ANOMALIES

BACKGROUND

A cloud-based network may provide one or more containers for different services provided by the cloud-based network. A container includes a stand-alone, executable package of software with everything needed for execution (e.g., code, runtime tools, system tools, system libraries, settings, and/or the like). A container may isolate software from surroundings and may reduce conflicts between users executing different software in a same cloud-based network. Multiple containers may execute on a same computing device of the cloud-based network, and may share an operating system kernel with other containers.

DETAILED DESCRIPTION OF PREFERRED EMBODIMENTS

The following detailed description of example implementations refers to the accompanying drawings. The same reference numbers in different drawings may identify the same or similar elements.

In an effort to secure a cloud-based network, secure access (e.g., login) mechanisms may be provided for user devices attempting to access the cloud-based network. However, detecting access anomalies (e.g., malicious logins, malicious user devices, and/or the like) associated with accessing containers of the cloud-based network is difficult. Unlike virtual machines, containers can be instantiated and terminated relatively quickly and at non-regular intervals, can be assigned varying network addresses (e.g., Internet protocol (IP) addresses) over time, and are not usually associated with specific hardware devices. Containers provide a way to virtualize an operating system so that multiple workloads can execute on a single operating system instance, whereas each virtual machine executes a unique guest operating system. Thus, current techniques for providing and monitoring secure access to containers of a cloud-based network waste computing resources (e.g., processing resources, memory resources, communication resources, and/or the like), networking resources, and/or the like associated with failing to detect malicious access to the cloud-based network, failing to eliminate malicious actions caused by malicious actors, repairing damage caused by the malicious actions, and/or the like.

Some implementations described herein provide a security platform for utilizing machine learning models to detect cloud-based network access anomalies. For example, the security platform may receive log data identifying access of user devices to containers provided by a cloud-based network, and may aggregate the log data to generate aggregated log data identifying container profiles associated with the containers. The security platform may train one or more machine learning models, with the aggregated log data, to generate one or more trained machine learning models, and may receive particular log data identifying access of a particular user device, of the user devices, to a particular container of the containers provided by the cloud-based network. The security platform may process the particular log data, with the one or more trained machine learning models, to identify an anomaly associated with the access of the particular user device to the particular container, and may perform one or more actions based on identifying the anomaly.

In this way, the security platform utilizes machine learning models to detect cloud-based network access anomalies. The security platform may provide a strong persistent defense against intrusion attempts of the cloud-based network by enabling the collection of network access attempts that might not have been recorded, may significantly bolster intrusion detection, and may reduce time-to-detection of intrusion attempts. Thus, the security platform conserves computing resources, networking resources, and/or the like that would otherwise be wasted in failing to detect malicious access to the cloud-based network, failing to eliminate malicious actions caused by malicious actors, repairing damage caused by the malicious actions, and/or the like.

Figure 1A:
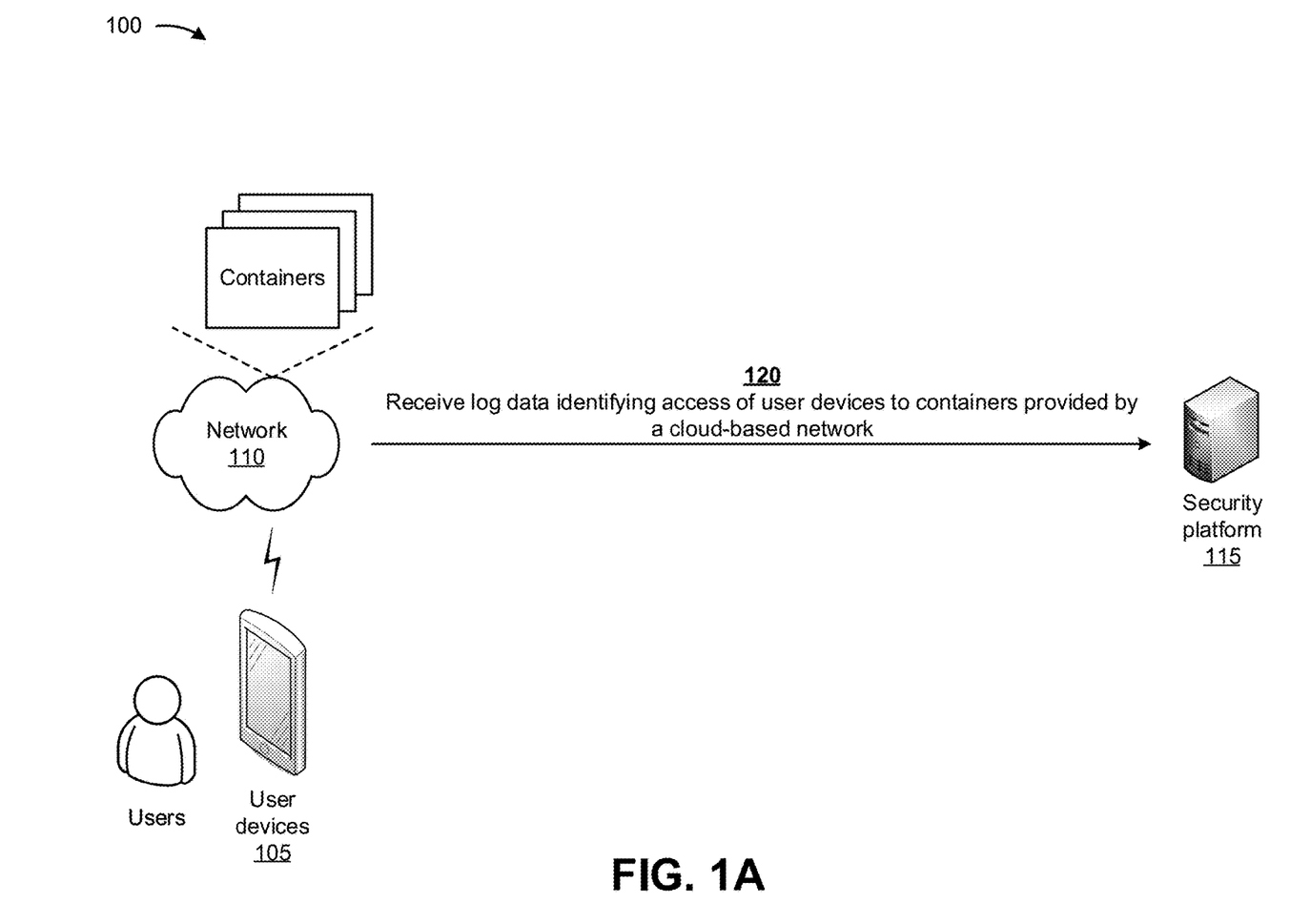
FIGS. 1A-1F are diagrams of one or more example implementations described herein.

FIGS. 1A-1F are diagrams of one or more example implementations 100 described herein. As shown in FIG. 1A, user devices 105 may be associated with users, a network 110, and a security platform 115. User devices 105 may include mobile devices, computers, a telephones, set-top boxes, and/or the like that the users may utilize to interact with and/or transmit/receive information to/from network 110. Network 110 may include a cloud-based network with one or more containers that may provide, for example, content and/or services to user devices 105. Security platform 115 may include a platform that utilizes machine learning models to detect access anomalies associated with network 110.

Containers used within network 110 may be configured to ensure compatibility with security platform 115. For example, such containers may be configured to direct log data emission to security platform 115 or another designated repository system. Configuration may be provided via specially configured container image files, which may include executable log data agents (e.g., or instructions to obtain and/or install executable agents) that configure and/or emit log data to security platform 115 (e.g., or another repository system that provides log data to security platform 115). In some implementations, the log data agents may be instantiated as part of a boot up process of new containers. In some implementations, configuration settings for the log data agents may be obtained from a known network information store that, for example, identifies and locates security platform 115 and/or other systems to which log data is to be transmitted (e.g., based on an Internet protocol (IP) address, a domain name, and/or another identifier). The log data may include various types of data, such as, for example, data identifying a container identifier for the container, a timestamp associated with the container identifier, a geographical location associated with the container, a network addresses allocated to the container, application information for applications executing inside the container, a network address for one or more user devices 105 associated with the container, identifiers of one or more user devices 105 associated with the container, login information for one of more user devices 105 associated with the container, and/or the like. In some implementations, the types of data include in the log data may be specified as part of the container configuration or may be obtained by the log data agent from a known network information store.

In some implementations, the log data agents may communicate with security platform 115, upon execution, to convey initial container-specific information (e.g., container identifiers, geographic identifiers, network addresses, timestamps and the like). In some implementations, the log data agents may periodically log container-specific information, which may be used to locate the container in a network and/or geographic topology over time.

As further shown in FIG. 1A, and by reference number 120, security platform 115 may receive log data identifying access of user devices 105 to containers provided by network 110. The log data may include data identifying times of day associated with user devices 105 accessing network 110, activities of user devices 105 while accessing network 110, network addresses of user devices 105 associated with the containers, hardware utilized by the containers, actions performed by user devices 105 within the containers, geographical locations associated with user devices 105, and/or the like. In some implementations, the log data may be captured in near-real time relative to when user devices 105 attempt to access and/or utilize the containers. In some implementations, security platform 115 may receive the log data directly from user devices 105, network 110, the containers of network 110, and/or the like. Additionally, or alternatively, security platform 115 may receive the log data from one or more other devices that receive the log data from user devices 105, network 110, the containers of network 110, and/or the like; store and/or manage the log data; and provide the log data to security platform 115. In this case, security platform 115 may periodically receive the log data, may continuously receive the log data, may receive the log data based on a request, and/or the like. In some implementations, the log data agents operating within containers may periodically send log data to security platform 115. In some implementations, security platform 115 may store the log data in a data structure (e.g., a database, a table, a list, and/or the like) associated with security platform 115.

Figure 1B:
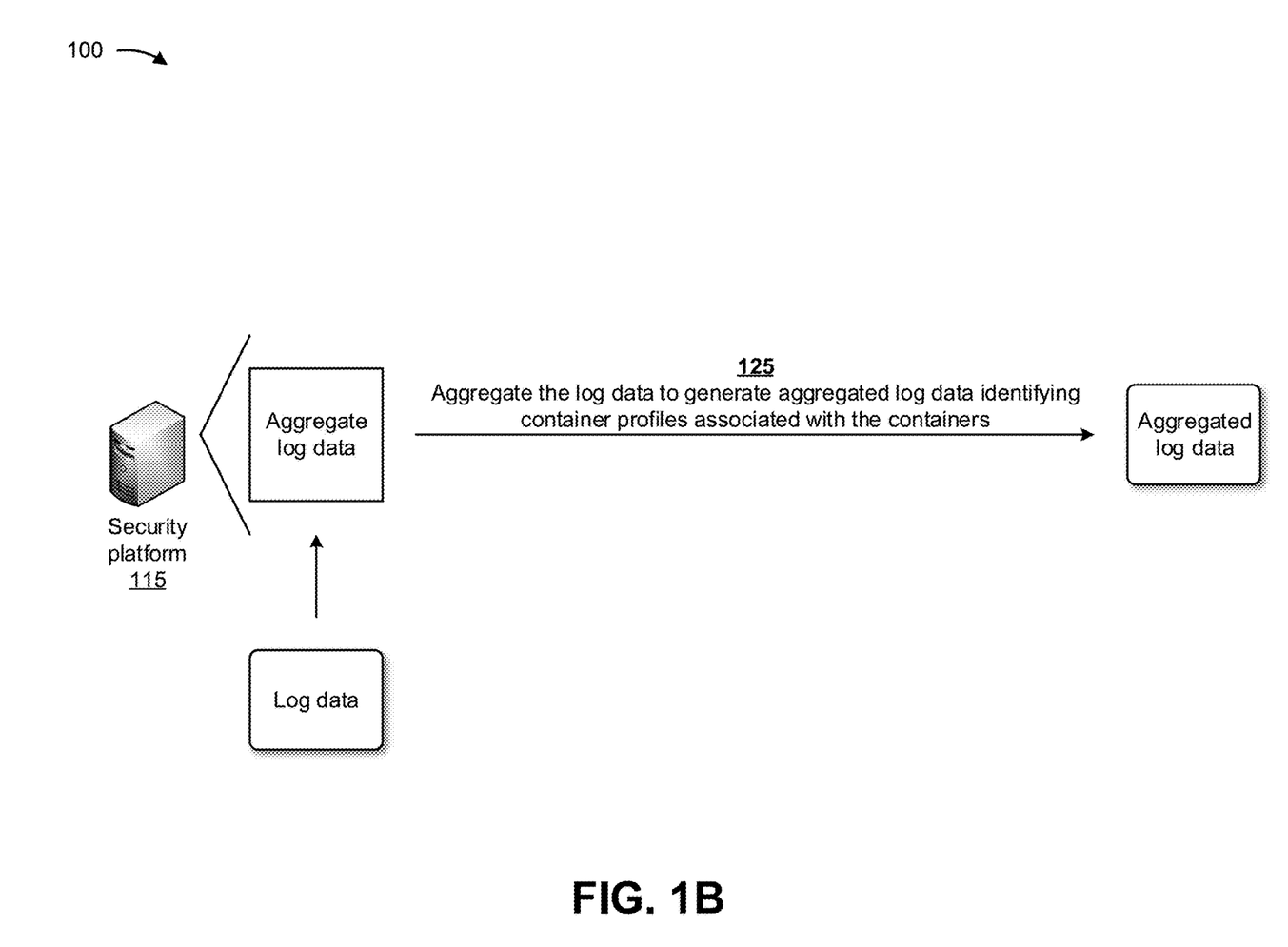

As shown in FIG. 1B, and by reference number 125, security platform 115 may aggregate the log data to generate aggregated log data identifying container profiles associated with the containers. Each of the container profiles may include data identifying a container identifier for each of the containers, a timestamp associated with the container identifier, a geographical location associated with each of the containers, network addresses allocated to one or more of user devices 105 associated with each of the containers, identifiers of one or more of user devices 105 associated with each of the containers, and/or the like.

In some implementations, when aggregating the log data to generate the aggregated log data, security platform 115 may utilize a time aggregation technique or a spatial aggregation technique to aggregate the log data and generate the aggregated log data. A time aggregation technique may include aggregating a time series (e.g., a collection of values observed during a given time period at some frequency) of data, such as the log data. Aggregation of time series of data can be seen as a data reduction process that summarizes a set of time series of data for use in clustering or in classification. Clustering may include an assignment phase and a centering or re-computation phase. During the assignment phase, a clustering model computes distances between each observation and each centroid, and allocates each observation to a closest cluster (e.g., minimum distance with a centroid). During the centering phase, the centroids are updated according to data points assigned to centroids. The centroids may be obtained by aggregating the observations of the same cluster. In classification, data reduction is used to reduce a training set into a smaller training set. Spatial aggregation is the aggregation of all data points for a group of resources over a specified time period (e.g., a granularity). A result of spatial aggregation is one data point that reflects a statistical view of the collected and aggregated data points (e.g., an average, a minimum, a maximum, a sum, a count, and/or the like).

In this way, security platform 115 may generate and maintain aggregated log data that can be used for data management, used to ensure compliance with data storage objectives or requirements, used for forensics purposes, used to train machine learning models, and/or the like. Furthermore, the aggregated log data may conserve computing resources, networking resources, and/or the like associated with the data management, training the machine learning models, and/or the like.

Figure 1C:
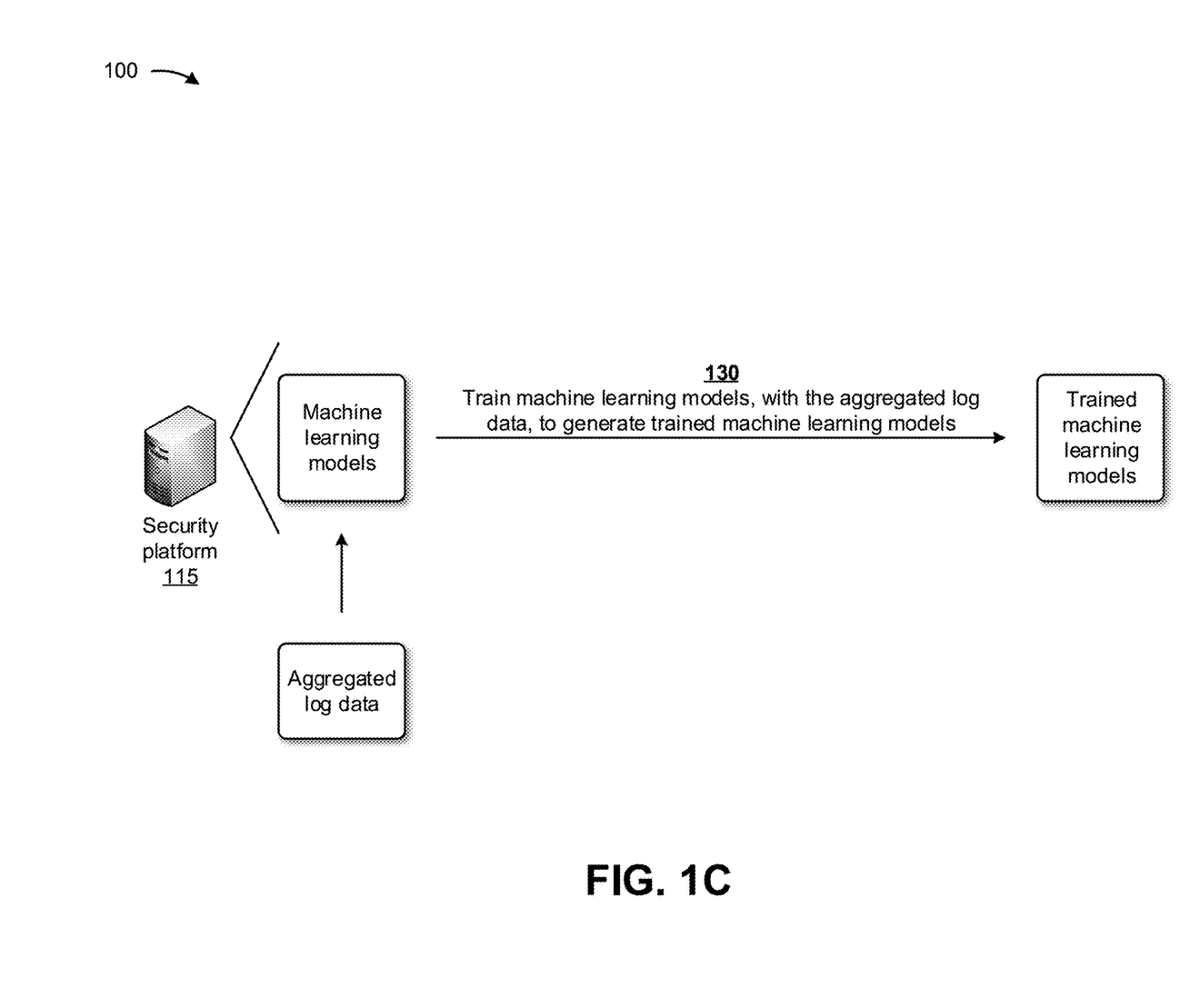

As shown in FIG. 1C, and by reference number 130, security platform 115 may train machine learning models, with the aggregated log data, to generate trained machine learning models. For example, security platform 115 may train the machine learning models to identify anomalies associated with access of user devices 105 to containers of network 110. In some implementations, the machine learning models may include classification models (e.g., classification tree machine learning models), heuristics models (e.g., that perform heuristics to identify normal behavior based on patterns), and/or the like. In some implementations, security platform 115 may separate the aggregated log data into a training set, a validation set, a test set, and/or the like. The training set may be utilized to train the machine learning models. The validation set may be utilized to validate results of the trained machine learning models. The test set may be utilized to test operation of the trained machine learning models.

In some implementations, the aggregated log data may include data identifying normal behavior and anomalous behavior, with respect to access of user devices 105 to containers of network 110. For example, the aggregated log data may include logs identifying issues associated with access of user devices 105 to containers of network 110, how the issues were addressed in the past (e.g., what actions worked and what actions did not work). The aggregated log data may include logs identifying normal behavior associated with access of user devices 105 to containers of network 110. Therefore, when a particular user device 105 accesses a particular container of network 110 in the future, the machine learning model may determine whether the access has any signs of anomalous behavior, may recommend handling the anomalous behavior in manner handled in the past, and/or the like.

In some implementations, security platform 115 may train the machine learning models using, for example, an unsupervised training procedure and based on the aggregated log data. For example, security platform 115 may perform dimensionality reduction to reduce the aggregated log data to a minimum feature set, thereby reducing resources (e.g., processing resources, memory resources, and/or the like) to train the neural network, and may apply a classification technique to the minimum feature set.

In some implementations, security platform 115 may use a logistic regression classification technique to determine a categorical outcome (e.g., predicting whether a container access attempt is associated with an anomaly event). Additionally, or alternatively, security platform 115 may use a naïve Bayesian classifier technique. In this case, security platform 115 may perform binary recursive partitioning to split the aggregated log data into partitions and/or branches, and use the partitions and/or branches to determine outcomes (e.g., predicting whether a container access attempt is associated with an anomaly event). Based on using recursive partitioning, security platform 115 may reduce utilization of computing resources relative to manual, linear sorting and analysis of data points, thereby enabling use of thousands, millions, or billions of data points to train the machine learning models, which may result in more accurate models than using fewer data points.

Additionally, or alternatively, security platform 115 may use a support vector machine (SVM) classifier technique to generate a non-linear boundary between data points in the training set. In this case, the non-linear boundary is used to classify test data into a particular class.

Additionally, or alternatively, security platform 115 may train the machine learning models using a supervised training procedure that includes receiving input to the machine learning models from a subject matter expert, which may reduce an amount of time, an amount of processing resources, and/or the like to train the machine learning models relative to an unsupervised training procedure. In some implementations, security platform 115 may use one or more other model training techniques, such as a latent semantic indexing technique, and/or the like. For example, security platform 115 may perform an artificial neural network processing technique (e.g., using a two-layer feedforward neural network architecture, a three-layer feedforward neural network architecture, and/or the like) to perform pattern recognition with regard to patterns of the aggregated log data. In this case, using the artificial neural network processing technique may improve an accuracy of the trained machine learning models (e.g., the trained neural network model) generated by security platform 115 by making the machine learning models more robust to noisy, imprecise, or incomplete data, and by enabling security platform 115 to detect patterns and/or trends undetectable to human analysts or systems using less complex techniques.

In some implementations, rather than training the machine learning models, security platform 115 may obtain one or more trained machine learning models from another system or device that trained the machine learning models to generate trained machine learning models. In this case, security platform 115 may provide the other system or device with the aggregated log data for use in training the machine learning models, and may provide the other system or device with updated aggregated log data to retrain the machine learning models in order to update the trained machine learning models.

Figure 1D:
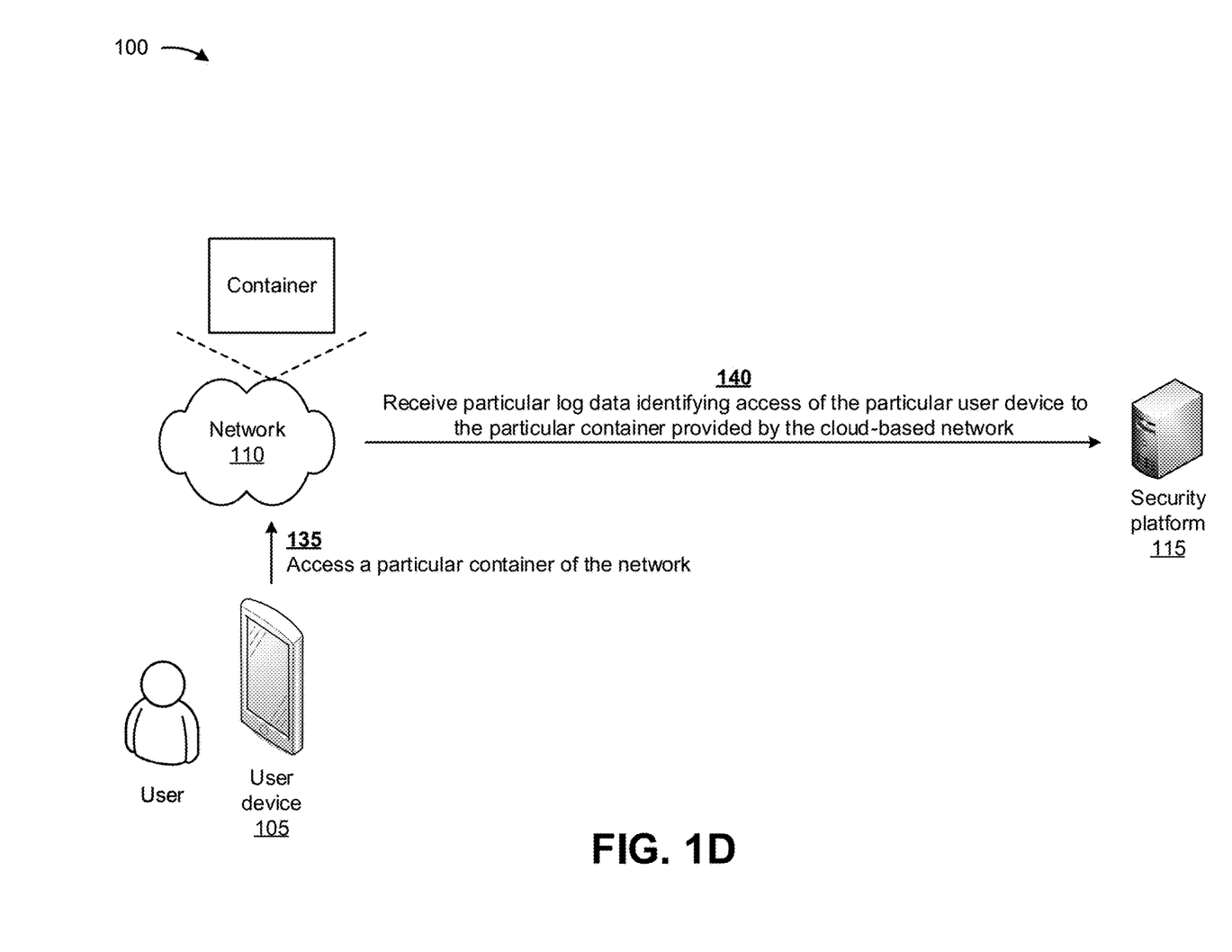

As shown in FIG. 1D, and by reference number 135, a particular user device 105 may attempt to access a particular container of network 110. For example, a particular user of the particular user device 105 may cause the particular user device 105 to access an application, a service, and/or the like provided by the particular container of network 110 at a time of day. Network 110 may assign a network address to the particular user device 105, and the particular user device 105 may perform activities while accessing network 110. The particular container may utilize hardware to provide the application or the service to the particular user device 105, and the particular user device 105 may perform actions within the particular container.

As further shown in FIG. 1D, and by reference number 140, security platform 115 may receive particular log data identifying access of the particular user device 105 to the particular container provided by network 110. For example, security platform 115 may receive the particular log data when the particular user causes the particular user device 105 to attempt to access the particular container provided by network 110. In some implementations, security platform 115 may receive the particular log data in near-real time relative to the particular user device 105 attempting to access the particular container of network 110. The particular log data may include data identifying a time of day associated with the particular user device 105 accessing the particular container of network 110, activities of the particular user device 105 while accessing the particular container of network 110, a network address of the particular user device 105, hardware utilized by the particular container to provide an application or a service to the particular user device 105, actions performed by the particular user device 105 within the particular container, a geographical location associated with the particular user device 105, and/or the like.

Figure 1E:
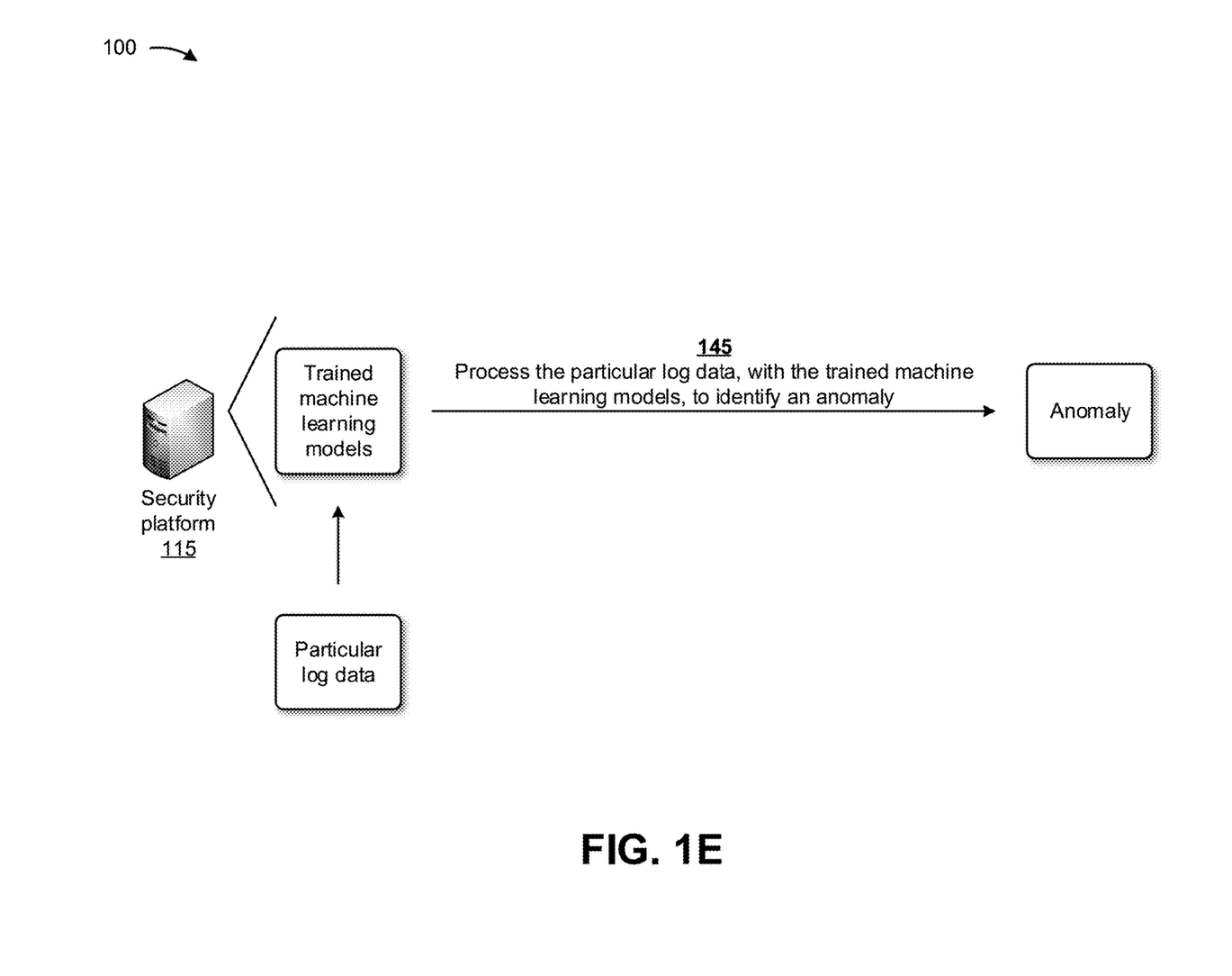

As shown in FIG. 1E, and by reference number 145, security platform 115 may process the particular log data, with the trained machine learning models, to identify an anomaly. In some implementations, the anomaly may include information indicating that the particular user device 105 is accessing the particular container of network 110 from a network address not associated with the particular user device 105, that the particular user device 105 is accessing the particular container of network 110 from a network address not within a network address range associated with the particular user device 105, that the time of day associated with the access of the particular user device 105 is abnormal, that the particular container being accessed by the particular user device 105 is abnormal, that the particular user device 105 is associated with a geographical location not associated with the particular user device 105, and/or the like. In some implementations, security platform 115 may process the particular log data, with the trained machine learning models, to identify the anomaly in near-real time relative to receiving the particular log data. In some implementations, security platform 115 may store the particular log data and the information identifying the anomaly in a data structure associated with security platform 115.

Figure 1F:
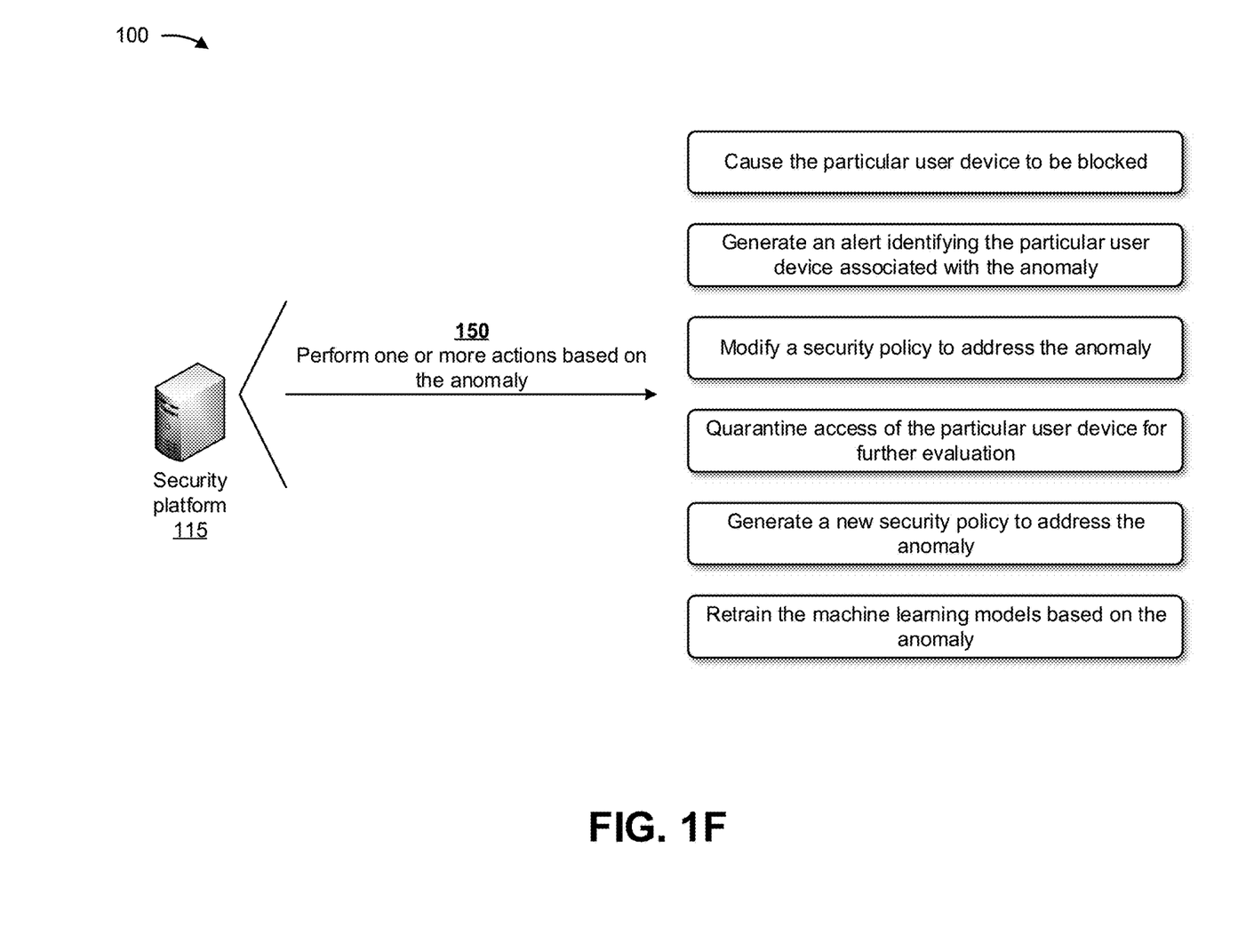

As shown in FIG. 1F, and by reference number 150, security platform 115 may perform one or more actions based on the anomaly. In some implementations, the one or more actions may include security platform 115 causing the particular user device 105 associated with the anomaly to be blocked. In this way, security platform 115 may prevent unintended or unauthorized access to software applications, computer servers and other systems, that could result in compromise of information (e.g., confidential, private, or personal information); may prevent theft or fraud; may prevent loss of valuable data; may prevent financial loss due to unauthorized use of financial accounts; may prevent failures of critical operations (e.g., business processes, communications, utilities management, and/or the like); and/or the like. This may conserve resources (e.g. computing resources, networking resources, and/or the like) that would otherwise be wasted remediating losses, recovering data and information, restoring operations, and/or the like.

In some implementations, the one or more actions may include security platform 115 generating an alert identifying the particular user device 105 associated with the anomaly. This may enable measures to be taken (e.g., by security personnel) to address the anomaly in a timely manner. For example, security platform 115 may generate the alert in near-real time relative to identifying the anomaly, and the alert may include information associated with the anomaly (e.g., information identifying a type of the anomaly, information included in the particular log data, and/or the like). Additionally, or alternatively, security platform 115 may generate and/or provide a rating or a score corresponding to a risk level associated with the anomaly. In some implementations, security platform 115 may provide different types of alerts for different types of anomalies, for different ratings or scores, and/or the like. In this way, security platform 115 may enable more effective measures to be taken (e.g., by security personnel) to address the anomaly, thereby conserving resources associated with addressing the anomaly and that would otherwise be wasted remediating losses, recovering data and information, restoring operations, and/or the like.

In some implementations, the one or more actions may include security platform 115 modifying a security policy to address the anomaly. For example, security platform 115 may increase a level of security associated with the anomaly, add additional measures to be taken to respond to the anomaly, improve measures that had been taken to respond to the anomaly, and/or the like. In this way, security platform 115 may continually adapt to trends, patterns, changes, or unexpected occurrences associated with access attempts in a responsive and timely fashion, thereby conserving resources that would otherwise be wasted remediating losses, recovering data and information, restoring operations, and/or the like.

In some implementations, the one or more actions may include security platform 115 quarantining access of the particular user device 105 for further evaluation. For example, security platform 115 may cause the particular user device 105 to be temporarily blocked from accessing network 110, may isolate software associated with the particular user device 105, and/or the like, until additional measures can be taken to examine the anomaly, the particular log data, and/or the like. In another example, security platform 115 may quarantine the particular container until the anomaly is resolved (e.g., malware uploaded to the particular container) by taking the particular container offline and adding a new container. In this way, security platform 115 may provide time to confirm an identity of a particular user of the particular user device 105 and/or to determine intentions of the particular user of the particular user device 105. This may conserve resources that would otherwise be wasted incorrectly blocking the particular user device 105 permanently, permitting a malicious user device 105 from persisting in network 110, and/or the like.

In some implementations, the one or more actions may include security platform 115 generating a new security policy to address the anomaly. For example, security platform 115 may generate a new policy that takes new security measures to address the anomaly. For example, if the anomaly relates to the particular user device 105 utilizing the particular container to steal particular data from network 110, the new security policy may include providing measures to prevent containers from accessing the particular data. In this way, security platform 115 may improve an ability to respond to anomalies, thereby conserving resources associated with addressing anomalies and that would otherwise be wasted remediating malicious acts caused by previously unaddressed anomalies.

In some implementations, the one or more actions may include security platform 115 retraining the machine learning models based on the anomaly. In this way, security platform 115 may improve the accuracy of the machine learning models in identifying anomalies associated with access of user devices 105 to the containers, and/or the like, which may improve speed and efficiency of the machine learning models and conserve computing resources, networking resources, and/or the like.

In some implementations, the one or more actions may include security platform 115 causing a remediation plan, addressing the anomaly, to be implemented in network 110 and the particular container. For example, security platform 115 may generate a remediation plan that prevents the containers from being accessed by user devices 105 exhibiting behavior similar to the anomaly. Security platform 115 may cause one or more network devices of network 110 to implement the remediation plan. In this way, security platform 115 may automatically respond to the anomaly (e.g., by performing a set of actions automatically determined based on the anomaly, a type of the anomaly, the particular log data, and/or the like), thereby conserving resources that would otherwise be wasted remediating losses, recovering data and information, restoring operations, and/or the like.

In some implementations, the one or more actions may include security platform 115 providing, for display, a notification identifying the anomaly. For example, security platform 115 may provide the notification for display via a user interface of the particular user device 105. In this way, security platform 115 may notify a user of the particular user interface 105 as to a status of an access attempt of network 110 (e.g., an access denial). As another example, security platform 115 may provide the notification for display via user interfaces of one or more user devices 105 associated with security personnel. In this way, security platform 115 may enable security personnel to quickly respond to anomalies and conserve resources that would otherwise be wasted remediating losses, recovering data and information, restoring operations, and/or the like.

In this way, security platform 115 utilizes machine learning models to detect cloud-based network (e.g., network 110) access anomalies. Security platform 115 may provide a strong persistent defense against intrusion attempts of network 110, may significantly bolster intrusion detection, and may reduce time-to-detection of intrusion attempts. Thus, security platform 115 conserves computing resources, networking resources, and/or the like that would otherwise be wasted in failing to detect malicious access to network 110, failing to eliminate malicious actions caused by malicious actors, repairing damage caused by the malicious actions, and/or the like.

Several different stages of the process for detecting cloud-based network access anomalies are automated with machine learning models, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning models to detect cloud-based network access anomalies in the manner described herein. Finally, the process for utilizing machine learning models to detect cloud-based network access anomalies conserves computing resources, networking resources, and/or the like that would otherwise be wasted in failing to detect malicious access to the cloud-based network, failing to eliminate malicious actions caused by malicious actors, repairing damage caused by the malicious actions, and/or the like.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
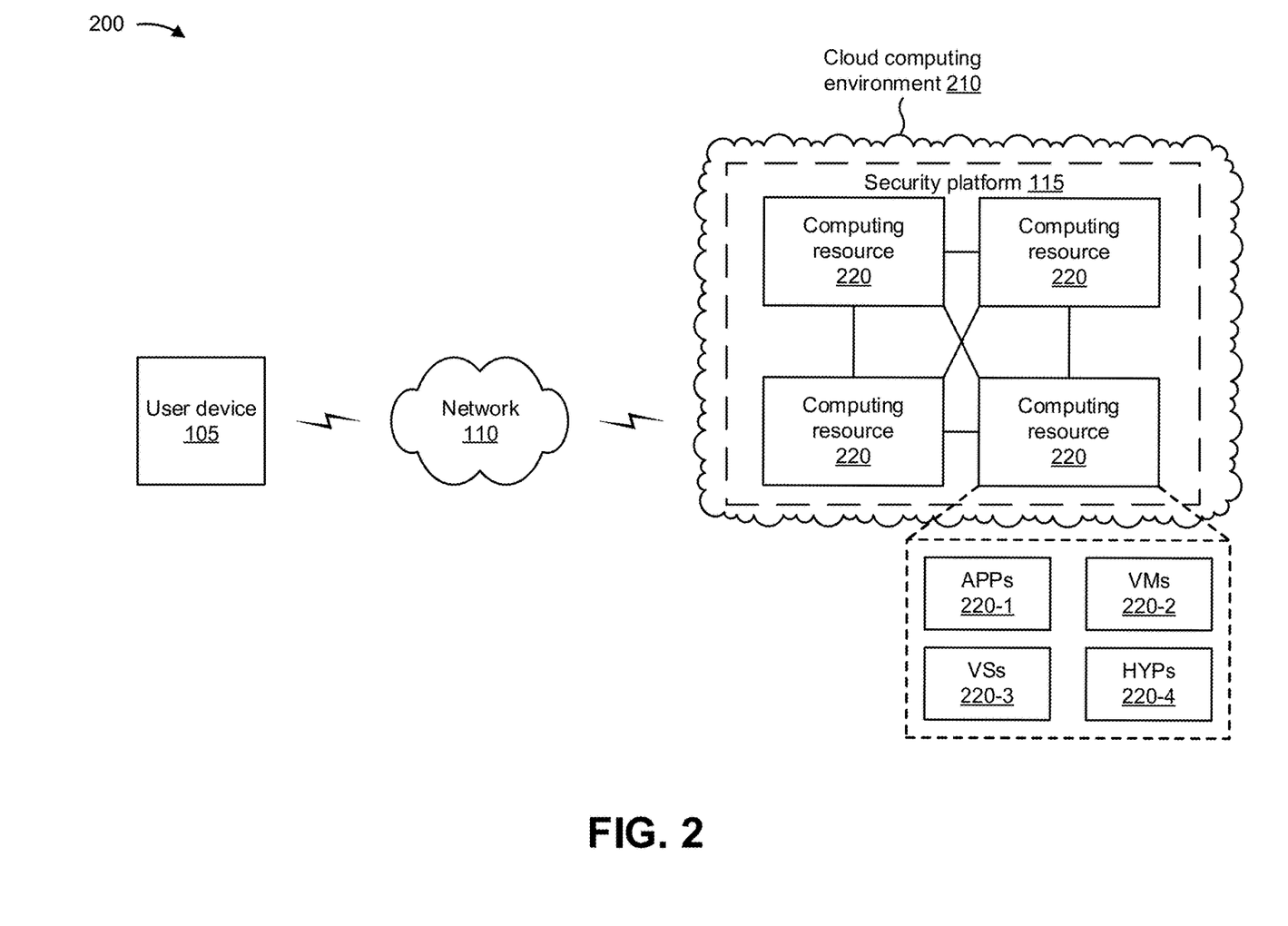
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, network 110, security platform 115, and a network 110. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.) or a similar type of device. In some implementations, user device 105 may receive information from and/or transmit information to network 110 and/or security platform 115.

Network 110 includes one or more wired and/or wireless networks. For example, network 110 may include a cloud-based network (e.g., similar to cloud computing environment 210 described below), a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 110 may receive information from and/or transmit information to user device 105 and/or security platform 115.

Security platform 115 includes one or more devices that utilize machine learning models to detect cloud-based network access anomalies. In some implementations, security platform 115 may be designed to be modular such that certain software components may be swapped in or out depending on a particular need. As such, security platform 115 may be easily and/or quickly reconfigured for different uses. In some implementations, security platform 115 may receive information from and/or transmit information to one or more user devices 105 and/or network 110.

In some implementations, as shown, security platform 115 may be hosted in a cloud computing environment 210. Notably, while implementations described herein describe security platform 115 as being hosted in cloud computing environment 210, in some implementations, security platform 115 may not be cloud-based (i.e., may be implemented outside of a cloud computing environment) or may be partially cloud-based.

Cloud computing environment 210 includes an environment that hosts security platform 115. Cloud computing environment 210 may provide computation, software, data access, storage, etc., services that do not require end-user knowledge of a physical location and configuration of system(s) and/or device(s) that hosts security platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host security platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with security platform 115 and/or any other software capable of being provided via cloud computing environment 210. In some implementations, one application 220-1 may send/receive information to/from one or more other applications 220-1, via a virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of security platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
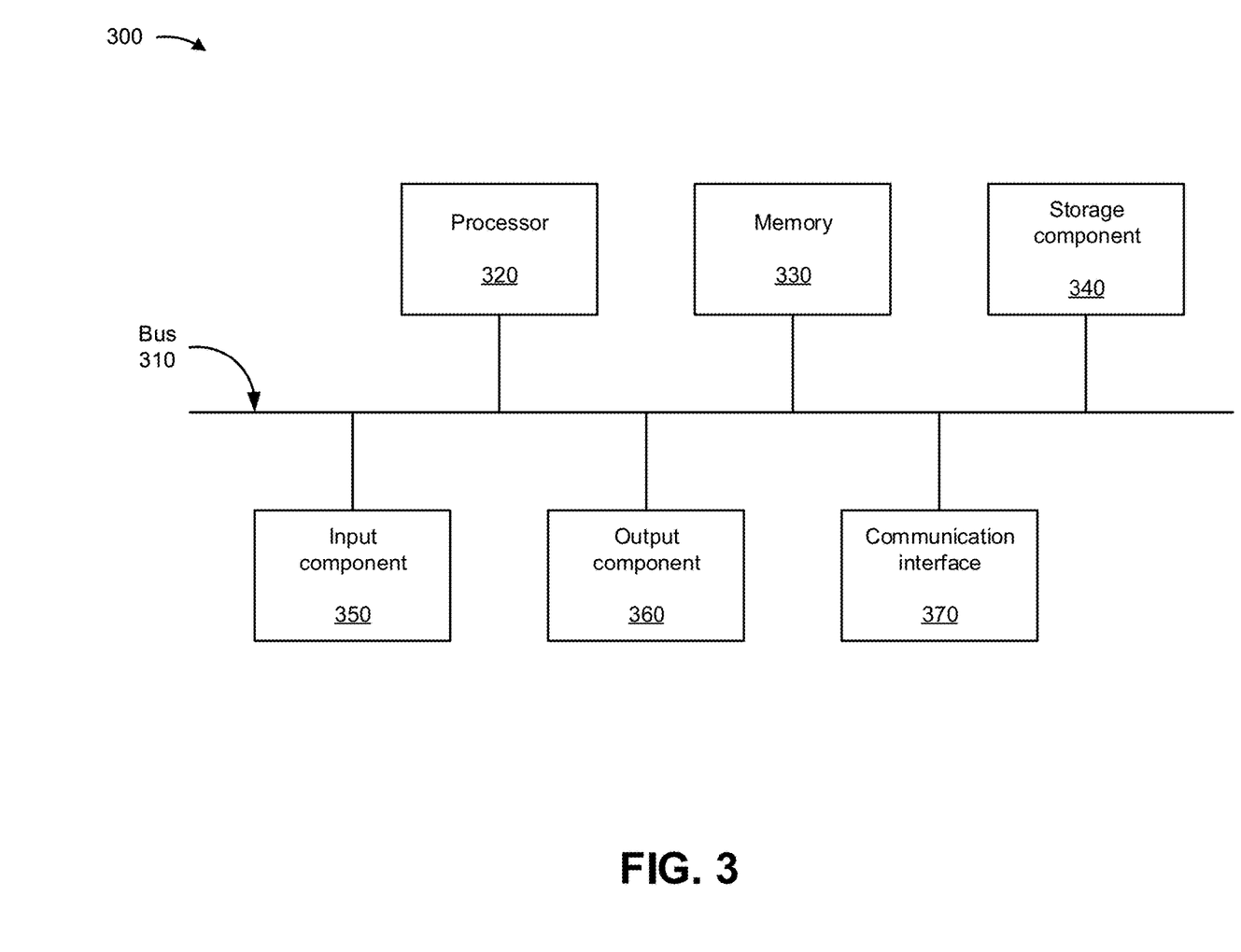
FIG. 3 is a diagram of example components of one or more devices of FIG. 2.

FIG. 3 is a diagram of example components of a device 300. Device 300 may correspond to user device 105, security platform 115, and/or computing resource 220. In some implementations, user device 105, security platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
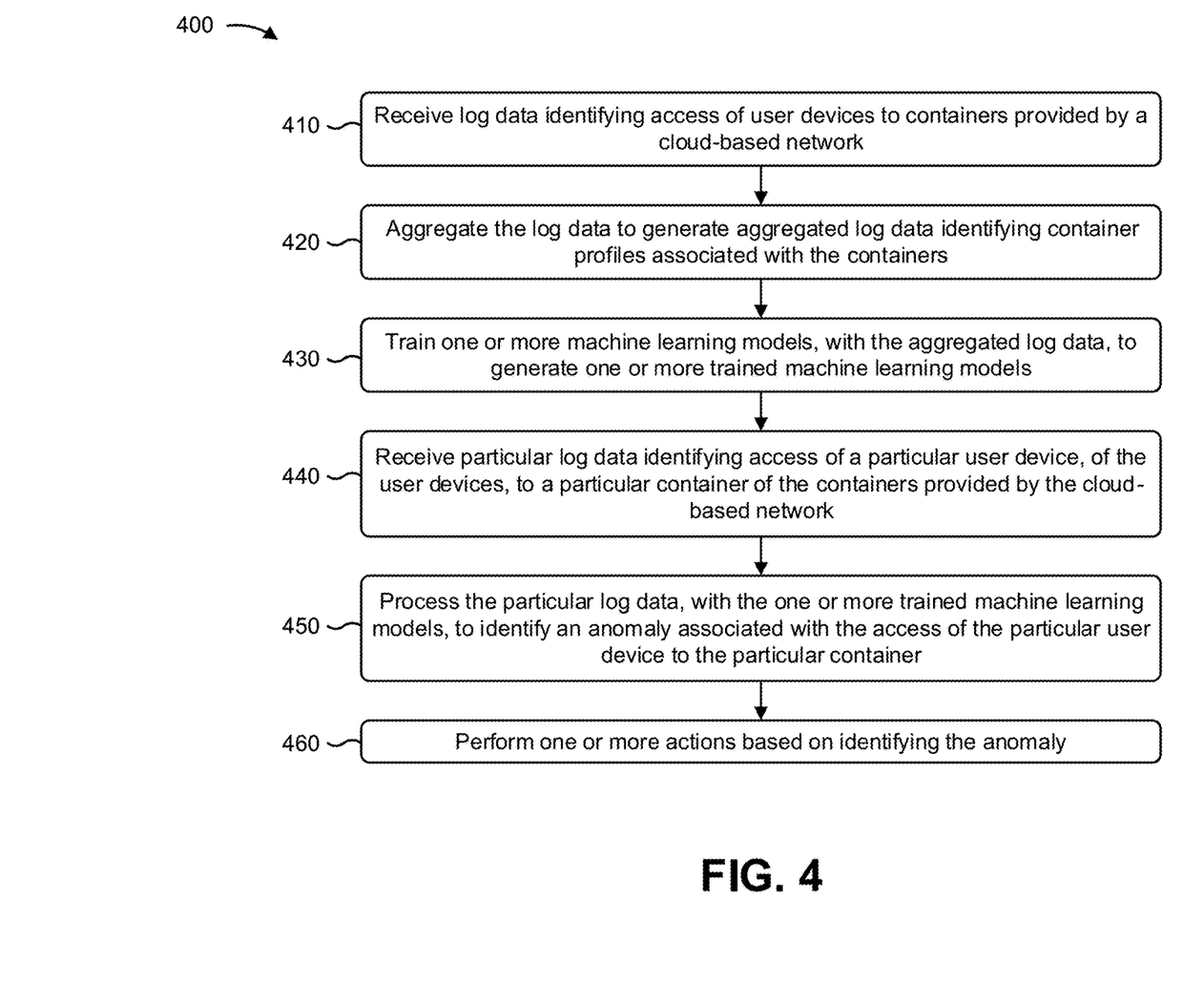
FIG. 4 is a flow chart of an example process for utilizing machine learning models to detect cloud-based network access anomalies.

FIG. 4 is a flow chart of an example process 400 for utilizing machine learning models to detect cloud-based network access anomalies. In some implementations, one or more process blocks of FIG. 4 may be performed by a device (e.g., security platform 115). In some implementations, one or more process blocks of FIG. 4 may be performed by another device or a group of devices separate from or including the device, such as a user device (e.g., user device 105).

As shown in FIG. 4, process 400 may include receiving log data identifying access of user devices to containers provided by a cloud-based network (block 410). For example, the device (e.g., using computing resource 220, processor 320, communication interface 370, and/or the like) may receive log data identifying access of user devices to containers provided by a cloud-based network, as described above. The log data may include data identifying times of day associated with the user devices accessing the cloud-based network, activities of the user devices while accessing the cloud-based network, network addresses of the user devices associated with the containers, hardware utilized by the containers, or actions performed by the user devices within the containers.

As further shown in FIG. 4, process 400 may include aggregating the log data to generate aggregated log data identifying container profiles associated with the containers (block 420). For example, the device (e.g., using computing resource 220, processor 320, memory 330, and/or the like) may aggregate the log data to generate aggregated log data identifying container profiles associated with the containers, as described above. Each of the container profiles may include data identifying a container identifier for each of the containers, a timestamp associated with the container identifier, a geographical location associated with each of the containers, network addresses allocated to one or more of the user devices associated with each of the containers, or one or more of the user devices associated with each of the containers. In some implementations, when aggregating the log data to generate the aggregated log data, process 400 may include utilizing a time aggregation technique or a spatial aggregation technique to aggregate the log data and generate the aggregated log data.

As further shown in FIG. 4, process 400 may include training one or more machine learning models, with the aggregated log data, to generate one or more trained machine learning models (block 430). For example, the device (e.g., using computing resource 220, processor 320, memory 330, storage component 340, and/or the like) may train one or more machine learning models, with the aggregated log data, to generate one or more trained machine learning models, as described above. The one or more machine learning models may include one or more classification tree machine learning models.

As further shown in FIG. 4, process 400 may include receiving particular log data identifying access of a particular user device, of the user devices, to a particular container of the containers provided by the cloud-based network (block 440). For example, the device (e.g., using computing resource 220, processor 320, communication interface 370, and/or the like) may receive particular log data identifying access of a particular user device, of the user devices, to a particular container of the containers provided by the cloud-based network, as described above.

As further shown in FIG. 4, process 400 may include processing the particular log data, with the one or more trained machine learning models, to identify an anomaly associated with the access of the particular user device to the particular container (block 450). For example, the device (e.g., using computing resource 220, processor 320, memory 330, storage component 340, and/or the like) may process the particular log data, with the one or more trained machine learning models, to identify an anomaly associated with the access of the particular user device to the particular container, as described above.

As further shown in FIG. 4, process 400 may include performing one or more actions based on identifying the anomaly (block 460). For example, the device (e.g., using computing resource 220, processor 320, memory 330, storage component 340, communication interface 370, and/or the like) may perform one or more actions based on identifying the anomaly, as described above. In some implementations, when performing the one or more actions, process 400 may include causing the particular user device to be blocked from further access to the cloud-based network and the particular container; generating an alert identifying the particular user device associated with the anomaly; or modifying a security policy to address the anomaly. In some implementations, when performing the one or more actions, process 400 may include quarantining access of the particular user device to the cloud-based network and the particular container, for further evaluation; generating a new security policy to address the anomaly; or retraining the one or more machine learning models based on the anomaly. In some implementations, when performing the one or more actions, process 400 may include causing a remediation plan, addressing the anomaly, to be implemented in the cloud-based network and the particular container. In some implementations, when performing the one or more actions, process 400 may include providing, for display, a notification identifying the anomaly.

The anomaly may include information indicating that the particular user device is accessing the cloud-based network and the particular container from a network address not associated with the particular user device, information indicating that the particular user device is accessing the cloud-based network and the particular container from a network address not within a network address range associated with the particular user device, and/or the like. The anomaly may be identified in near-real time relative to receiving the particular log data.

Process 400 may include additional implementations, such as any single implementation or any combination of implementations described below and/or in connection with one or more other processes described elsewhere herein.

In some implementations, process 400 may include storing the log data, the aggregated log data, and information identifying the anomaly in a data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from containers of a cloud-based network, log data identifying access of user devices to the containers;
   aggregating, by the device, the log data to generate aggregated log data identifying container profiles associated with the containers;
   training, by the device, one or more machine learning models, with the aggregated log data, to generate one or more trained machine learning models;
   receiving, by the device, particular log data identifying access of a particular user device, of the user devices, to a particular container of the containers provided by the cloud-based network;
   processing, by the device, the particular log data, with the one or more trained machine learning models, to identify an anomaly associated with the access of the particular user device to the particular container; and
   performing, by the device, one or more actions based on identifying the anomaly.

2. The method of claim 1, wherein the log data includes data identifying one or more of:
   times of day associated with the user devices accessing the cloud-based network,
   activities of the user devices while accessing the cloud-based network,
   network addresses of the user devices associated with the containers,
   hardware utilized by the containers, or
   actions performed by the user devices within the containers.

3. The method of claim 1, wherein each of the container profiles includes data identifying one or more of:
   a container identifier for each of the containers,
   a timestamp associated with the container identifier,
   a geographical location associated with each of the containers,
   network addresses allocated to one or more of the user devices associated with each of the containers, or
   one or more of the user devices associated with each of the containers.

4. The method of claim 1, wherein performing the one or more actions comprises one or more of:
   causing the particular user device to be blocked from further access to the cloud-based network and the particular container;
   generating an alert identifying the particular user device associated with the anomaly; or
   modifying a security policy to address the anomaly.

5. The method of claim 1, wherein performing the one or more actions comprises one or more of:
   quarantining access of the particular user device to the cloud-based network and the particular container, for further evaluation;
   generating a new security policy to address the anomaly; or
   retraining the one or more machine learning models based on the anomaly.

6. The method of claim 1, wherein the one or more machine learning models include one or more classification tree machine learning models.

7. The method of claim 1, wherein the anomaly includes information indicating that the particular user device is accessing the cloud-based network and the particular container from a network address not associated with the particular user device.

8. A device, comprising:
   one or more memories; and
   one or more processors, communicatively coupled to the one or more memories, configured to:
     receive, from a particular container of a cloud-based network, particular log data identifying access of a particular user device to the particular container,
       wherein the particular user device is one of a plurality of user devices accessing containers of the cloud-based network, and
       wherein the particular container is one of the containers;
     process the particular log data, with one or more machine learning models, to identify an anomaly associated with the access of the particular user device to the particular container,
       wherein the one or more machine learning models are received from another device and trained, by the other device, with aggregated log data identifying container profiles associated with the containers,
         wherein the aggregated log data is aggregated based on log data identifying access of the plurality of user devices to the containers; and
     perform one or more actions based on identifying the anomaly,
       wherein the one or more actions include one or more of:
         causing the particular user device to be blocked from further access to the cloud-based network and the particular container,
         generating an alert identifying the particular user device associated with the anomaly, modifying a security policy to address the anomaly, quarantining access of the particular user device to the cloud-based network and the particular container, for further evaluation, or generating a new security policy to address the anomaly.

9. The device of claim 8, wherein the anomaly includes information indicating that the particular user device is accessing the cloud-based network and the particular container from a network address not within a network address range associated with the particular user device.

10. The device of claim 8, wherein the one or more processors are further configured to:

store the log data, the aggregated log data, and information identifying the anomaly in a data structure.

11. The device of claim 8, wherein the one or more processors, when performing the one or more actions, are configured to:

cause a remediation plan, addressing the anomaly, to be implemented in the cloud-based network and the particular container.

12. The device of claim 8, wherein the one or more processors, when aggregating the log data to generate the aggregated log data, are configured to:

utilize a time aggregation technique or a spatial aggregation technique to aggregate the log data and generate the aggregated log data.

13. The device of claim 8, wherein types of data included in the particular log data are specified as part of a configuration of the particular container.

14. The device of claim 8, wherein the one or more processors, when performing the one or more actions, are configured to:

provide, for display, a notification identifying the anomaly.

15. A non-transitory computer-readable medium storing instructions, the instructions comprising:

one or more instructions that, when executed by one or more processors, cause the one or more processors to:

receive, from containers of a cloud-based network, log data identifying access of user devices to the containers;

aggregate the log data to generate aggregated log data identifying container profiles associated with the containers, wherein each of the container profiles includes data identifying one or more of:

a container identifier for each of the containers, a timestamp associated with the container identifier, a geographical location associated with each of the containers, network addresses allocated to one or more of the user devices associated with each of the containers, or one or more of the user devices associated with each of the containers;

train one or more machine learning models, with the aggregated log data, to generate one or more trained machine learning models;

receive particular log data identifying access of a particular user device, of the user devices, to a particular container of the containers provided by the cloud-based network;

process the particular log data, with the one or more trained machine learning models, to identify an anomaly associated with the access of the particular user device to the particular container; and perform one or more actions based on identifying the anomaly.

16. The non-transitory computer-readable medium of claim 15, wherein the one or more instructions, that cause the one or more processors to perform the one or more actions, cause the one or more processors to one or more of:

cause the particular user device to be blocked from further access to the cloud-based network and the particular container;

generate an alert identifying the particular user device associated with the anomaly; or modify a security policy to address the anomaly.

17. The non-transitory computer-readable medium of claim 15, wherein the one or more instructions, that cause the one or more processors to perform the one or more actions, cause the one or more processors to one or more of:

quarantine access of the particular user device to the cloud-based network and the particular container, for further evaluation;

generate a new security policy to address the anomaly; or retrain the one or more machine learning models based on the anomaly.

18. The non-transitory computer-readable medium of claim 15, wherein the anomaly includes information indicating that the particular user device is accessing the cloud-based network and the particular container from a network address not within a network address range associated with the particular user device.

19. The non-transitory computer-readable medium of claim 15, wherein the instructions further comprise:

one or more instructions that, when executed by the one or more processors, cause the one or more processors to:

store the log data, the aggregated log data, and information identifying the anomaly in a data structure.

20. The non-transitory computer-readable medium of claim 15, wherein types of data included in the particular log data are specified as part of a configuration of the particular container.

* * * * *